US012649168B2

(12) United States Patent
Drexler et al.

(10) Patent No.: US 12,649,168 B2
(45) Date of Patent: Jun. 9, 2026

(54) METHODS FOR FORMING LIQUID MANAGEMENT PATTERNS ON A SURFACE OF A STRUCTURE OF A VEHICLE

(71) Applicant: THE BOEING COMPANY, Arlington, VA (US)

(72) Inventors: Jason Drexler, Edmonds, WA (US); Edward Ryan Greene, Ladson, SC (US); Stephanie Iris Metting, Seattle, WA (US); Xiaoxi Wang, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 400 days.

(21) Appl. No.: 18/458,245

(22) Filed: Aug. 30, 2023

(65) Prior Publication Data

US 2023/0398568 A1 Dec. 14, 2023

Related U.S. Application Data

(63) Continuation-in-part of application No. 18/183,604, filed on Mar. 14, 2023, and a continuation-in-part of application No. 16/787,129, filed on Feb. 11, 2020, now Pat. No. 12,275,520, and a continuation-in-part of application No. 16/787,115, filed on Feb. 11, 2020, now Pat. No. 12,269,574.

(51) Int. Cl.
*B05D 1/02* (2006.01)
*B05D 3/06* (2006.01)

(52) U.S. Cl.
CPC ............... *B05D 1/02* (2013.01); *B05D 3/067* (2013.01)

(58) Field of Classification Search
CPC .......... B05D 1/02; B05D 3/067; B64C 1/067; Y02T 50/40
See application file for complete search history.

(56) References Cited

U.S. PATENT DOCUMENTS

| | | | |
|---|---|---|---|
| 9,272,465 | B2 | 3/2016 | Wilde |
| 11,155,035 | B2 | 10/2021 | Miller et al. |
| 2004/0000165 | A1 | 1/2004 | Max |
| 2005/0052516 | A1 | 3/2005 | Wilde |
| 2006/0068109 | A1 | 3/2006 | Frankenberger |

(Continued)

FOREIGN PATENT DOCUMENTS

| | | |
|---|---|---|
| CN | 103221771 | 7/2013 |
| CN | 103 521 410 | 1/2014 |

(Continued)

OTHER PUBLICATIONS

Extended European Search Report for EP 24192035.4, dated Jan. 15, 2025.

(Continued)

*Primary Examiner* — William P Fletcher, III
(74) *Attorney, Agent, or Firm* — Joseph M. Butscher; Carroll, Hoette & Butscher, LLC

(57) ABSTRACT

A method includes printing one or more features on a surface of a structure of an aircraft, and providing, by the one or more features, one or more liquid management patterns. The printing can includes controlling, by a control unit, a printer to form the one or more features on the surface of the structure. The method can also include curing the one or more features with ultraviolet (UV) light.

20 Claims, 11 Drawing Sheets

(56) References Cited

U.S. PATENT DOCUMENTS

| | | | |
|---|---|---|---|
| 2009/0269837 | A1 | 10/2009 | Shevkoplyas |
| 2011/0177303 | A1 | 7/2011 | Suehiro |
| 2016/0243586 | A1* | 8/2016 | Travis .................. F15D 1/0085 |
| 2017/0080747 | A1 | 3/2017 | Young |
| 2017/0341305 | A1 | 11/2017 | Miller |
| 2020/0047868 | A1 | 2/2020 | Young |
| 2020/0255955 | A1* | 8/2020 | Desai ........................ C23F 1/02 |
| 2021/0245859 | A1 | 8/2021 | Perkins |
| 2022/0274398 | A1 | 9/2022 | Tawata |

FOREIGN PATENT DOCUMENTS

| | | |
|---|---|---|
| CN | 106232696 | 12/2016 |
| CN | 108431109 | 8/2018 |
| JP | 2010 162801 | 7/2010 |
| JP | 2017 124777 | 7/2017 |
| JP | 2017 193113 | 10/2017 |

OTHER PUBLICATIONS

Extended European Search Report for EP App. No. 24151980.0-1014, dated Jul. 2, 2024.
English translation of JP 2010 162801.
English translation of JP 2017 193113.
English translation of JP 2017 124777.

* cited by examiner

METHODS FOR FORMING LIQUID MANAGEMENT PATTERNS ON A SURFACE OF A STRUCTURE OF A VEHICLE

CROSS-REFERENCE TO RELATED APPLICATIONS

This application is a continuation-in-part of U.S. patent application Ser. No. 16/787,115, filed Feb. 11, 2020, entitled "Methods for Forming Liquid Flow Paths on a Surface of a Structure," now U.S. Pat. No. 12,269,574, which is hereby incorporated by reference in its entirety.

This application is also a continuation-in-part of U.S. patent application Ser. No. 16/787,129, filed Feb. 11, 2020, entitled "Liquid-Diverting Panel Assemblies and Methods," now U.S. Pat. No. 12,275,520, which is hereby incorporated by reference in its entirety.

This application is also a continuation-in-part of U.S. patent application Ser. No. 18/183,604, filed Mar. 14, 2023, entitled "Systems and Methods for Printing a Tactile Textured Surface on a Surface of a Component," which is hereby incorporated by reference in its entirety.

FIELD OF THE DISCLOSURE

Examples of the present disclosure generally relate to liquid management methods, and more particularly, to methods for forming liquid management patterns on a surface of a structure, such as on or within an aircraft.

BACKGROUND OF THE DISCLOSURE

As an airplane is operated, condensation may occur during various phases of flight. During aircraft design and manufacture, special consideration is given with respect to the potential of moisture within the airplane, so as to ensure that corrosion of various internal structures, short-circuiting, arcing, and/or degradation of electrical components, and the like, does not occur. In general, condensation is directly related to environmental conditions within an internal cabin of the airplane, and indirectly related to ambient conditions outside of the airplane when grounded. Passengers, crew, onboard meals, and onboard beverages may contribute to condensation within an airplane.

Water accumulation due to condensation occurs in both short and long range flights, but is generally more excessive in continuous long-range flights over six hours having quick turn-around departures. Accordingly, various systems and methods have been developed to control and manage condensation within an airplane.

Many airplanes include various moisture management devices to minimize or otherwise reduce moisture within an internal cabin. For example, drains, moisture impermeable insulation blankets, zonal air dryers (such as dehumidifiers), humidity control systems, and other such moisture management devices are used to capture and/or direct moisture away from an internal cabin interior and divert the moisture to a bilge, through which the moisture drains overboard via pressure valves.

As can be appreciated, however, the various moisture management devices add weight and cost to an airplane. Further, installing the various moisture management devices increases manufacturing time.

Also, during installation, absorbent moisture management devices may be compressively rolled or stacked in relation to other aircraft components. As the moisture management device is compressed, internal absorbing space within the moisture management device is also compressed, which may reduce the ability of the moisture management device to absorb and retain moisture. Therefore, as the moisture management device is compressed, its effectiveness may decrease.

SUMMARY OF THE DISCLOSURE

A need exists for efficient moisture management within an aircraft. Further, a need exists for an efficient method of forming structures that are configured to manage moisture.

With those needs in mind, certain examples of the present disclosure provide a method including printing one or more features on a surface of a structure of an aircraft; and providing, by the one or more features, one or more liquid management patterns.

The one or more liquid management patterns can include one or more liquid retaining patterns, and/or one or more liquid flow paths.

In at least one example, the method also includes curing the one or more features with ultraviolet (UV) light.

The structure can be within an internal cabin of the aircraft.

In at least one example, the printing includes controlling, by a control unit, a printer to form the one or more features on the surface of the structure. Said controlling can include varying a speed of a print head of the printer to vary one or more attributes of the one or more features. Said varying the speed can include varying the speed of the print head of the printer during a single pass of the print head in relation to the surface of the structure. Said varying the speed can include reducing the speed of the print head to form the one or more features having an increased height. Said varying the speed can include increasing the speed of the print head to form the one or more features having an increased width.

The method can also include creating, by the control unit, a desired output display that includes the one or more features through unit vector mapping.

Said controlling can also include jetting ink from one or more nozzles of the print head at a constant print frequency.

The method can also include one or more of in-mold texturing, bonding, cutting, chemical etching, or superficial foaming at least a portion of the one or more features.

DETAILED DESCRIPTION OF THE DISCLOSURE

Figure 1:
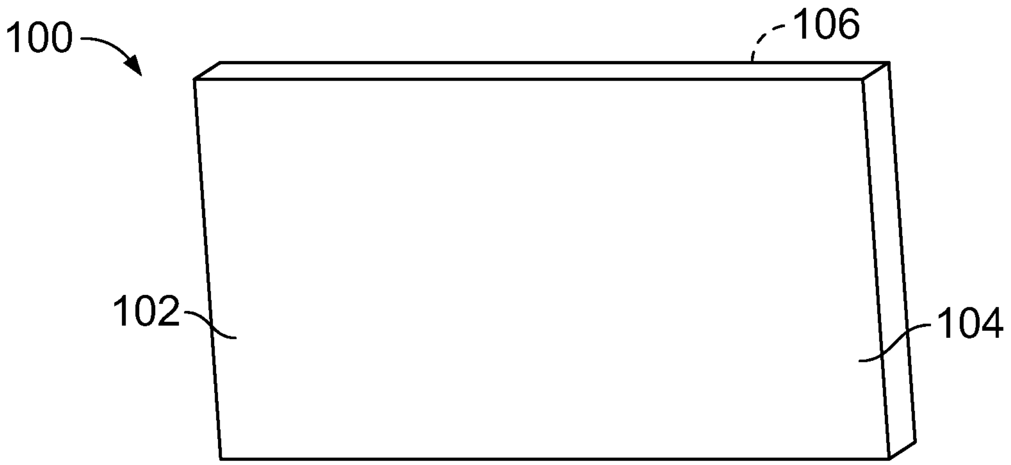
FIG. 1 illustrates a perspective front view of a structure, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide systems and methods for printing textured features on a component, such as may have a complex curvature, in a single pass of a print head. In at least one example, the component is a structure within an internal cabin of a vehicle, such as a commercial aircraft. In at least one example, the textured features include liquid management patterns, such as liquid flow paths, liquid retaining patterns, and/or the like. Optionally, the printing can include multiple passes to form the textured features.

Examples of the present disclosure provide a method for providing moisture control in an interior of an aircraft. The method includes creating surface features to retain or divert moisture in the aircraft interior. In at least one example, the method uses digital inkjet texture printing with ultraviolet (UV) curable inks to create protruded features on the surface of a decorative laminate (such as on a backside of a ceiling or sidewall panel) or other type of substrate to control liquid diverting or wicking. In at least one example, condensed moisture is retained on the surfaces to evaporate, be removed later, and/or be diverted to designated locations (as opposed to dripping on individuals).

In at least one example, a liquid diverting pattern is printed on a surface, such as a decorative surface within an internal cabin of an aircraft. As another example, a printed liquid diverting pattern is applied onto the surface.

Examples of the present disclosure provide methods of forming liquid management patterns on a surface of a structure. In at least one example, liquid flow paths divert liquid to designated locations, such as a drain, bilge, or the like. The structure having the liquid flow paths can be used in various settings, such as within a vehicle (such as an aircraft, automobile, train car, watercraft, or the like), a building (such as a residential or commercial property), and/or various articles of manufacture.

Certain examples of the present disclosure provide a method including providing a structure having an outer surface, and printing one or more liquid management patterns on the outer surface. In at least one example, the printed liquid management patterns have a first wettability (or first surface flow resistance) that differs from other portions of the structure. For example, liquid flow paths are between banks having a second wettability (or second flow resistance) that differs from the first wettability. The first wettability provides increased liquid flow in comparison to the second wettability. Accordingly, liquid flows over the liquid flow paths.

Examples of the present disclosure provide structures that are configured to control condensation, such as within an aircraft, vehicle, building, or the like. Further, certain examples of the present disclosure provide structures that route liquid to desired locations without increasing weight and cost (in contrast to separate and distinct moisture control devices) to a system.

Certain examples of the present disclosure provide a panel assembly, such as may be used within an aircraft. The panel assembly includes areas of different surface energy, which are configured to control moisture. Areas of first (or second) surface energy (associated with a first (or second) wettability) are hydrophobic and discourage moisture flow. Areas of second (or first) surface energy (associated with a second (or first) wettability) are non-hydrophobic and encourage moisture flow. In at least one example, an outer surface of the panel assembly includes a liquid flow path including a flow-directing network having a plurality of interconnected flow director elements that collect and route moisture via gravitational force.

Certain examples of the present disclosure provide a panel assembly that includes a pattern of different surface energies over a surface. Such integral surface features route moisture from across an entire area of the surface of the panel assembly to designated drainage paths. The drainage paths may connect with other moisture routing features, or allow the moisture to freely flow into a bilge area, for example.

Certain examples of the present disclosure provide a panel assembly that includes an inner ply, a core, and an outer ply. The outer ply includes a surface treatment. The surface treatment includes at least one liquid flow path for diverting moisture. The outer ply may include an insulation layer for resisting sound and/or heat.

In at least one example, the surface treatment includes a liquid flow path formed by branches and stems. The branches and stems are configured to channel liquid towards a union of the branches and stems. The flow direction is substantially aligned with a direction of gravitational or inertial force.

FIG. 1 illustrates a perspective front view of a structure 100, according to an example of the present disclosure. In at least one example, the structure 100 is a panel, sheet, or the like. In at least one other example, the structure 100 is a block, sphere, pyramid, irregularly-shaped structure, or the like.

As shown, the structure 100 can be a flat sheet of material. Optionally, the structure 100 can include one or more curved surfaces.

The structure 100 includes a first face 102 having an exposed surface 104. The first face 102 is coupled to a second face 106 opposite from the first face 102. The first face 102 can be a front, rear, top, bottom, lateral, or other such face. The surface 104 is an outer surface of the structure 100.

The structure 100 is formed of a material, such as a plastic, metal, composite, and/or the like. For example, the structure 100 can be formed of a thermoplastic, such as nylon, polycarbonate (PC), polyphenylsulfone (PPSU), polyetherimide (PEI), or the like. As another example, the structure 100 can be formed of epoxy, phenolic materials, and/or the like.

Figure 2:
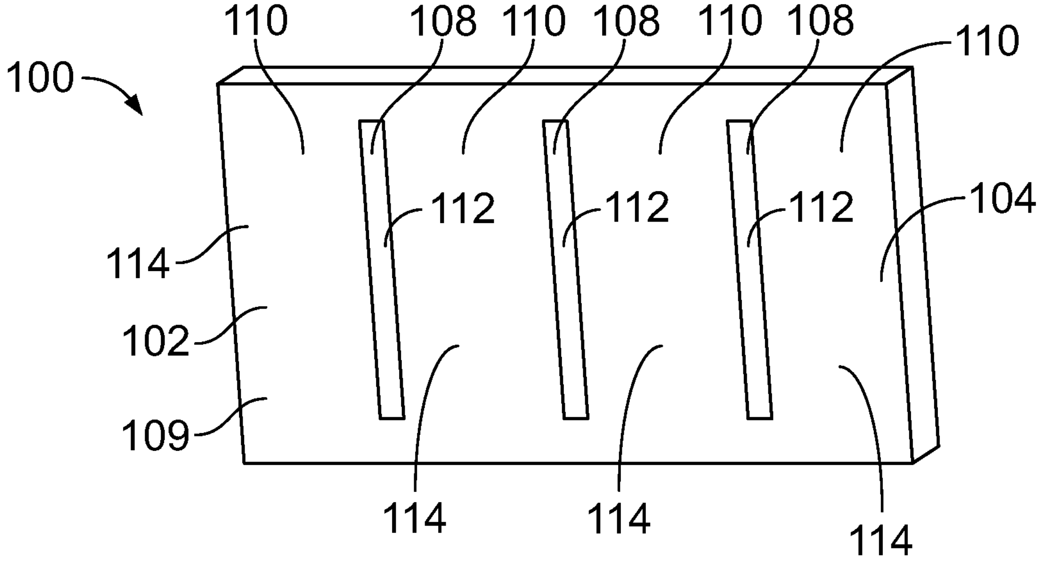
FIG. 2 illustrates a perspective front view of the structure having liquid flow paths formed through surface treatment, according to an example of the present disclosure.

FIG. 2 illustrates a perspective front view of the structure 100 having liquid flow paths 108 formed through surface treatment, according to an example of the present disclosure. The liquid flow paths 108 are examples of liquid management patterns. The liquid flow paths 108 are formed on a main body 109, such as between banks 110. The liquid flow paths 108 have a first wettability 112 that differs from a second wettability 114 of the remainder of the main body 109, such as the banks 110. The first wettability 112 provides increased liquid flow rate as compared to the second wettability 114. As such, the first wettability 112 of the liquid flow paths 108 allows for liquid to flow with increased ease as compared to the banks 110. In this manner, the liquid flow paths 108 are configured to divert liquid, such as water, to a desired location, such as a bilge, drain, or the like, such as via gravity.

Liquid can flow on the banks 110. However, the banks 110 resist liquid flow greater than the liquid flow paths 108. During a flight of an aircraft, structures within an aircraft may vibrate. Due to gravity and vibration during a flight, liquid gathers and flows along the liquid flow paths 108. In at least one example, boundaries between treated and untreated areas provide the banks 110.

It is to be understood that first and second in relation to wettability are merely terms used to differentiate. That is, the first wettability differs from the second wettability. The liquid flow paths 108 have increased wettability in comparison to the remainder of the main body 109 of the structure 100, such as that of the banks 110. It is to be understood that the first wettability is not necessarily one of increased wettability. For example, the liquid flow paths 108 may have a second wettability that is increased in relation to a first wettability of the banks 110.

The structure 100 can include more or less liquid flow paths 108 than shown. Further, the liquid flow paths 108 can be sized and shaped differently than shown. For example, the liquid flow paths 108 can be horizontally or diagonally oriented, instead of vertically oriented. As another example, the liquid flow paths 108 can include one or more curved portions, instead of being linear.

The wettability of a surface relates to surface tension or surface energy of a liquid, such as water. Wettability relates to surface flow resistance. As an example, increasing wettability of a surface increases a likelihood that the liquid flows over the surface, in contrast to beading up on the surface. Conversely, decreasing wettability of a surface increases a likelihood that the liquid will bead on the surface, as opposed to flowing over the surface. As another example, increasing the surface flow resistance of a surface decreases a likelihood that liquid flows over the surface, in contrast to beading up on the surface. Conversely, decreasing the surface flow resistance of a surface decreases a likelihood that the liquid will bead on the surface, as opposed to flow over the surface. For example, a bank 110 has a higher surface flow resistance than a liquid flow path 108.

Figure 3A:
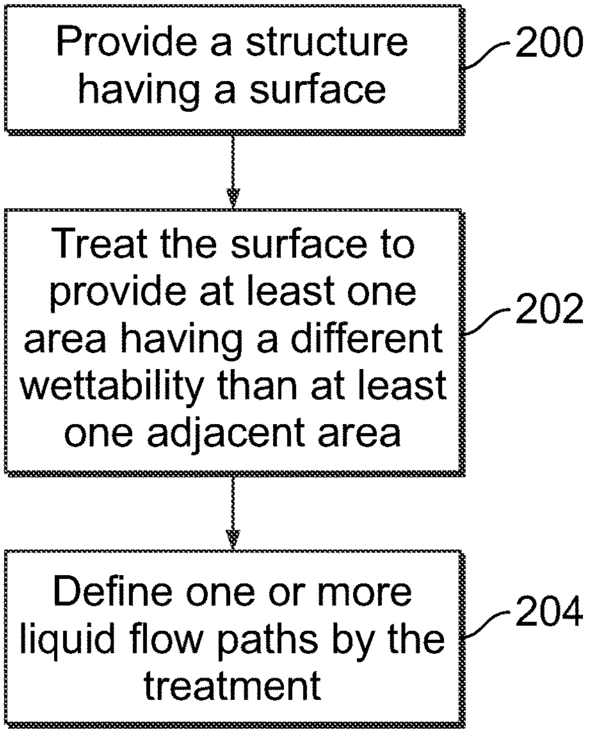
FIG. 3A illustrates a flow chart of a method of forming one or more liquid flow paths on a surface of a structure, according to an example of the present disclosure.

FIG. 3A illustrates a flow chart of a method of forming one or more liquid flow paths on a surface of a structure, according to an example of the present disclosure. Referring to FIGS. 1-3A, at 200, the structure 100 having the surface 104 is provided. At 202, the surface 104 is treated to provide at least one area having a different wettability than at least one area that is adjacent to the at least one area. In at least one example, the surface 104 is treated by printing. For example, one or more liquid flow paths 108 are printed on the surface 104. The printing provides the liquid flow path(s) 108, while the at least one area that is adjacent to the at least one area can be or include one or more banks 110. Accordingly, at 204, the one or more liquid flow paths 108 are defined by the treatment of the surface 104, such as via printing.

The structure 100 can be formed of a thermoplastic or thermoset, such as an epoxy or phenolic material. In at least one example, the treatment includes printing. The treatment can also include in-mold texturing, bonding, cutting, chemical etching, painting using a blocking layer, and/or the like. As another example, the structure 100 can be nylon, PC, PPSU, PEI, or the like, and the treatment can also include superficial foaming, bonding, texturing, chemical etching, or the like. The treatment, such as printing, modifies at least a portion of the surface 104 to define one or more liquid flow paths 108 having a different wettability than a remainder of the main body 109, such as the banks 110.

In at least one example, treating a portion of the surface 104 of the structure 100 to form one or more liquid flow paths 108 includes printing on the portion, such through three-dimensional printing, ink printing, laser printing, and/or the like, to modify a wettability of the portion. The treating can also include one or more of chemically etching the portion to modify a wettability of the portion, and/or superficial foaming the portion to modify a wettability of the portion. In at least one example, the treating includes printing on the portion, texturing the portion to modify a wettability of the portion, chemically etching the portion to modify a wettability of the portion, and superficial foaming the portion to modify a wettability of the portion.

In at least one example, in addition to printing the liquid flow paths 108, the treatment of the surface 104 also includes superficial foaming. For example, in the case of a thermoplastic surface, a physical foaming agent (such as high pressure carbon dioxide gas or supercritical carbon dioxide) can be applied to the localized area on surface 104, such as at areas that are to be the liquid flow paths 108. In the saturation process, the physical foaming agent can be allowed to remain on the surface 104 for a predetermined period of time to diffuse into the area for a certain depth, such as ten minutes (optionally, the time period can be more or less than ten minutes, such as twenty minutes, or five minutes). The physical foaming agent is then removed, and the structure 100 can then be heated leading to superficial foaming, which thereby modifies the areas to a certain depth. In this manner, superficial foaming modifies a wettability of areas of the structure. Further, during the saturation process, an area to be treated may be sealed locally to maintain a high pressure gas state or supercritical state for the physical foaming agent.

Figure 3B:
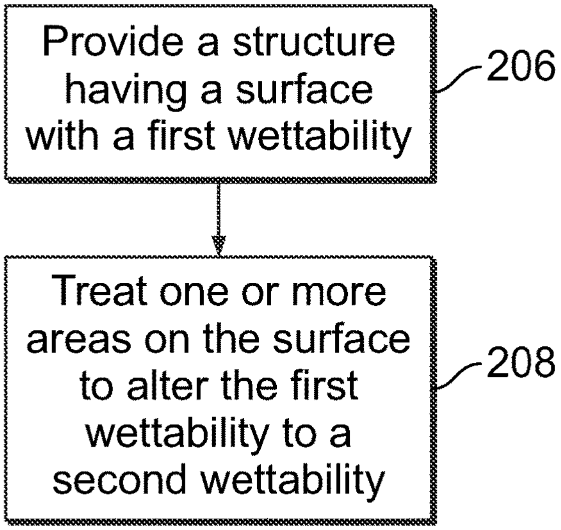
FIG. 3B illustrates a flow chart of a method of forming one or more liquid flow paths on a surface of a structure, according to an example of the present disclosure.

FIG. 3B illustrates a flow chart of a method of forming one or more liquid flow paths on a surface of a structure, according to an example of the present disclosure. Referring to FIGS. 1, 2, and 3B, at 206, the structure 100 having the surface 104 with a first wettability is provided. As an example, the first wettability can be one in which water beads on the surface. As such, the first wettability can be a relatively low wettability in that water beads thereon, instead of flowing over the surface 104. Next, at 208, one or more areas are treated on the surface to alter the first wettability to a second wettability. In at least one example, the treatment includes printing. The treatment can also include superficial foaming, chemical etching, painting, and/or or the like. In at least one example, the one or more areas are desired locations for the liquid flow paths 108. As such, the second wettability is greater than the first wettability. That is, the second wettability allows for increased liquid flow, and decreased liquid beading.

As another example, the first wettability can be one in which water tends to flow over, as opposed to bead. As such, the first wettability can be a relatively high wettability. In this embodiment, areas on the surface 104 are treated to alter the first wettability to a second wettability that is less than the first wettability. As such, the areas that are formed through surface treatment can be those that are desired to be the banks 110. The liquid flow paths 108 are formed between the banks 110.

Figure 3C:
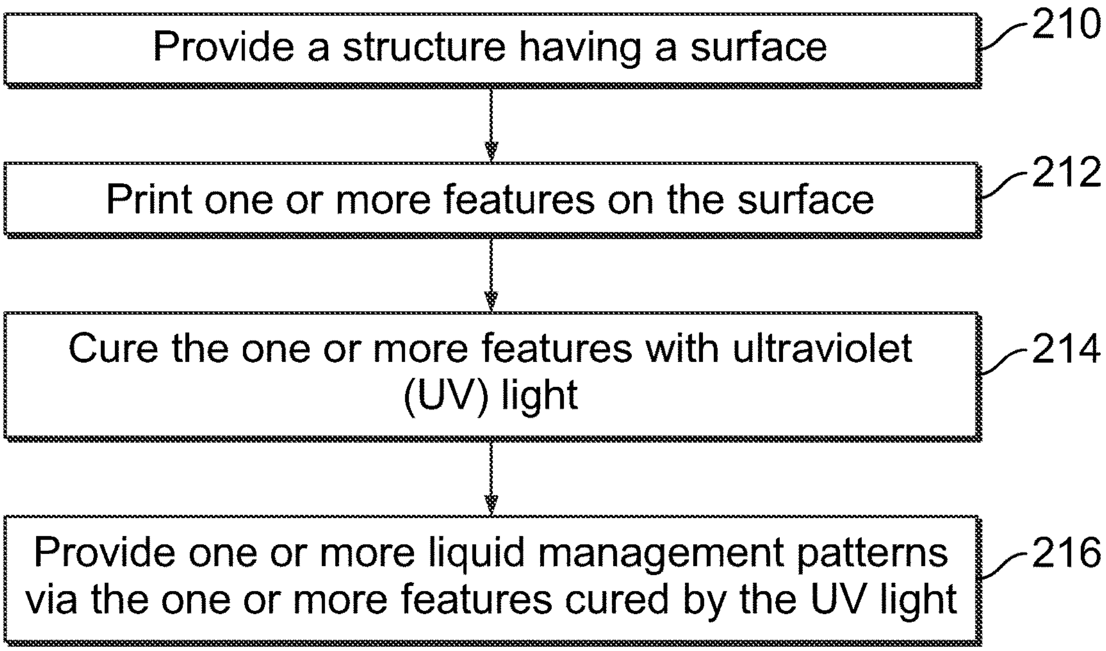
FIG. 3C illustrates a flow chart of a method of forming one or more liquid management patterns on a surface of a structure, according to an example of the present disclosure.

FIG. 3C illustrates a flow chart of a method of forming one or more liquid management patterns on a surface of a structure, according to an example of the present disclosure. In at least one example, the liquid management patterns include one or more liquid retaining patterns. In at least one other example, the liquid management patterns include one or more liquid flow paths. In at least one other example, the liquid management patterns include one or more liquid retaining patterns and one or more liquid flow paths.

Referring to FIGS. 1, 2, and 3C, at 210, the structure 100 having the surface 104 is provided. At 212, one or more features are printed on the surface 104. At 214, the one or more features are cured with ultraviolet (UV) light, such as emitted by a UV light emitting device. At 216, one or more liquid management patterns, such as liquid retaining patterns and/or liquid flow paths 108, are provided via the one or more features, which were cured with by the UV light. Optionally, the method may not include 214. Instead, the feature(s) can be printed on the surface 104 and not cured with UV light.

The liquid management patterns provide moisture control, such as within an internal cabin of an aircraft. The features printed on the surface 104 are configured to retain and/or divert moisture. In at least one example, a digital inkjet printer provides the printing, such as via texture printing with UV curable inks, to create protruded features on the surface 104 of the structure 100, which can be a decorative laminate or other substrate to control liquid diverting or wicking. In at least one example, condensed moisture is retained on the surfaces to evaporate, be removed later, or be diverted to designated locations, as opposed to dripping on the passengers.

In at least one example, the features are formed through a printer applying UV curable ink to the surface 104. The printer can print banks and valleys for various surface areas, such as within an internal cabin of a vehicle. In at least one example, a liquid retaining pattern or liquid flow path(s) 108 is printed directly on a decorative laminate, which can be applied on interior commodities, such as a front face of a stowage bin. In at least one other example, the decorative laminate is applied on the interior commodities, and the liquid retaining pattern or flow path(s) is printed directly on the decorative laminate. The liquid retaining pattern can be configured to retain excess liquid or moisture on the surface, such that it may evaporate, or be removed by crew members. The liquid diverting pattern diverts excess liquid or moisture to designated locations to prevent accumulation or dripping into undesired areas.

In at least one example, the printer can operate to provide a liquid management pattern that is configured to provide wicking via capillary phenomenon. In such an example, the printer may be configured to deposit ink over multiple passes. As another example, the printer can operate to provide a liquid management pattern that is configured to provide liquid flow paths to divert and guide liquid to desired locations. In such an example, the liquid flow paths can be formed by the printer depositing ink over a single pass.

As described herein, in at least one example, a method includes printing one or more features on the surface 104 of the structure 100 of an internal cabin of an aircraft, and providing, by the one or more printed features, one or more liquid management patterns. In at least one example, the one or more liquid management patterns include one or more liquid retaining patterns, and/or one or more liquid flow paths. In at least one example, the method also includes curing the one or more features with ultraviolet (UV) light.

Figure 4A:
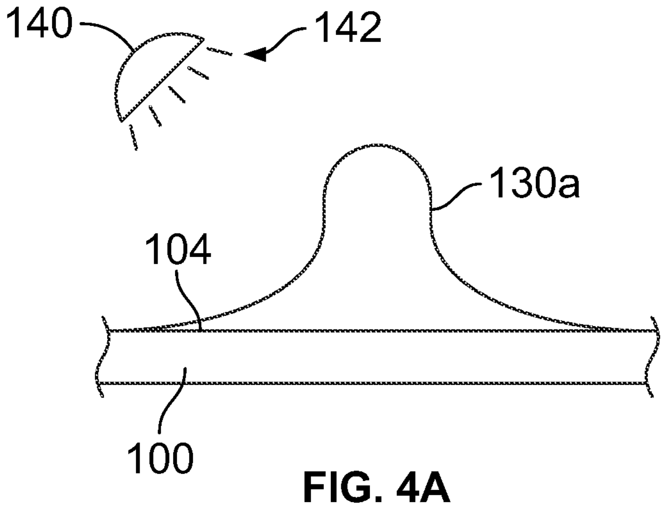
FIG. 4A illustrates a transverse cross-sectional view of a feature printed on a surface of a structure, according to an example of the present disclosure.
Figure 4B:
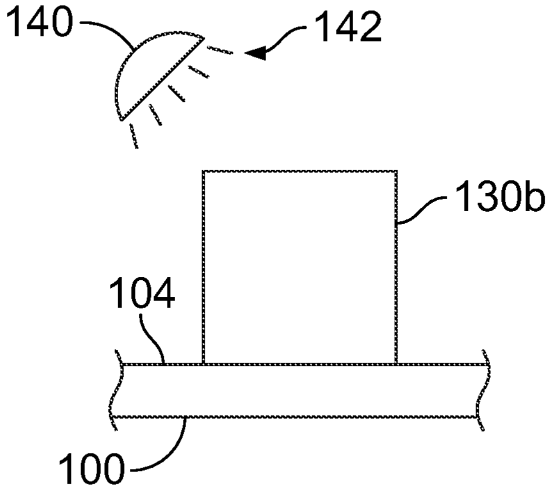
FIG. 4B illustrates a transverse cross-sectional view of a feature printed on a surface of a structure, according to an example of the present disclosure.
Figure 4C:
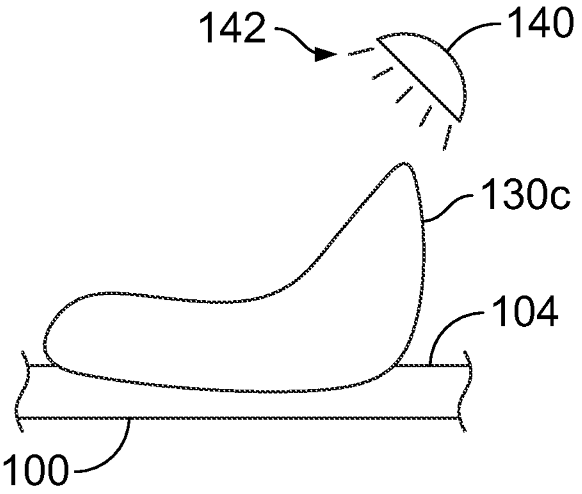
FIG. 4C illustrates a transverse cross-sectional view of a feature printed on a surface of a structure, according to an example of the present disclosure.

FIG. 4A illustrates a transverse cross-sectional view of a feature 130*a* printed on a surface 104 of a structure 100, according to an example of the present disclosure. FIG. 4B illustrates a transverse cross-sectional view of a feature 130*b* printed on a surface 104 of a structure 100, according to an example of the present disclosure. FIG. 4C illustrates a transverse cross-sectional view of a feature 130*c* printed on a surface 104 of a structure 100, according to an example of the present disclosure. FIGS. 4A-C show examples of the feature 130*a*, 130*b*, and 130*c*. A feature may be sized and shaped differently than shown in FIGS. 4A-C. The features 130*a*, 130*b*, and 130*c* can be formed by a printer depositing ink (such as UV curable ink) onto the surface 104 over one or more passes. An emitting device 140 (such as a UV lamp) can then be operated to emit UV light 142 to cure the ink to form a liquid management pattern, such as a liquid retaining pattern, a liquid flow path, and/or the like. Optionally, the feature(s) may not be cured with UV light. The features shown in FIGS. 4A-C are simplified, general shapes. It is to be understood that the features can include different profiles, shapes, rounded portions, and/or the like.

Referring to FIGS. 1-4C, the feature(s) can be formed to provide liquid wicking via capillary phenomenon. As an example, the printed features can be 20 um in width and 20 um in height of the print, with a spacing of 20 um. Such features can be formed using digitally printed texture for high definition, such as via multiple passes.

As another example, the feature(s) can be formed to provide general liquid diverting/guiding channels. As an example, the printed features can be 0.5 mm in width and 0.5 mm in height, with a spacing of 0.5 mm. Such features can be formed using printing with multi-pass inkjet systems, single pass inkjet systems, and/or coating/varnishing equipment.

As described herein, examples of the present disclosure provide methods of forming one or more liquid management patterns, such as liquid retaining patterns(s) and/or liquid flow path(s), on a surface of a structure. The method includes providing the structure, and printing one or more features on the surface of the structure to provide the liquid management patterns, which can alter or otherwise modify a wettability thereof. In at least one example, a first wettability of the portion of the surface differs from a second wettability of a remainder of the surface. In at least one example, the first wettability allows for increased flow of liquid in comparison to the second wettability. In at least one other example, the first wettability allows for decreased flow of liquid as compared to the second wettability.

In at least one example, the printing increases the wettability, thereby providing the liquid management patterns at the locations of printed material (for example, at the portion(s) where treated). In at least one other example, the printing decreases the wettability.

Figure 5:
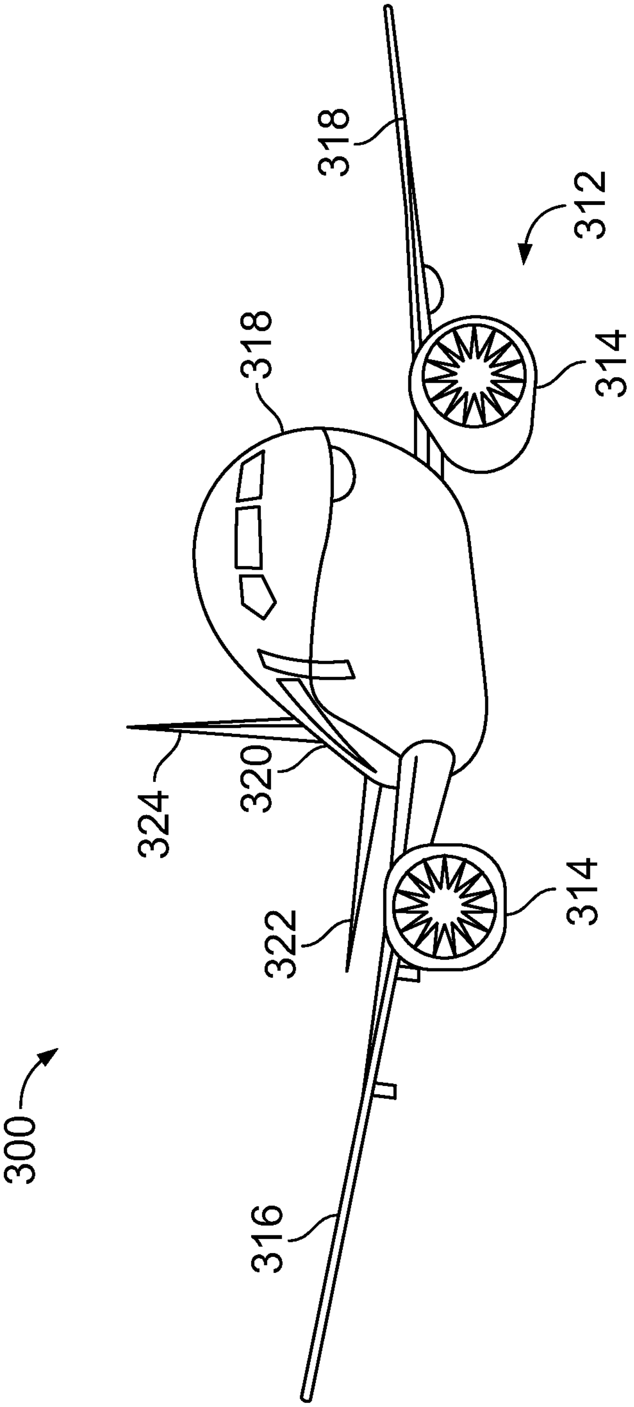
FIG. 5 illustrates a perspective front view of an aircraft, according to an example of the present disclosure.

FIG. 5 illustrates a perspective front view of an aircraft 300, according to an example of the present disclosure. The aircraft 300 includes a propulsion system 312 that may include two turbofan engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324.

The fuselage 318 of the aircraft 300 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section. Portions of the aircraft 300, such as panels within the internal cabin, can be formed by methods to form liquid management patterns (such as liquid flow paths and/or liquid retaining patterns), as described herein.

Optionally, instead of an aircraft, examples of the present disclosure may be used with various other vehicles, such as automobiles, buses, locomotives and train cars, watercraft, spacecraft, and the like. As another example, methods as described herein can be used to form structures having liquid management patterns for structures within buildings, articles of manufacture, or the like.

Figure 6:
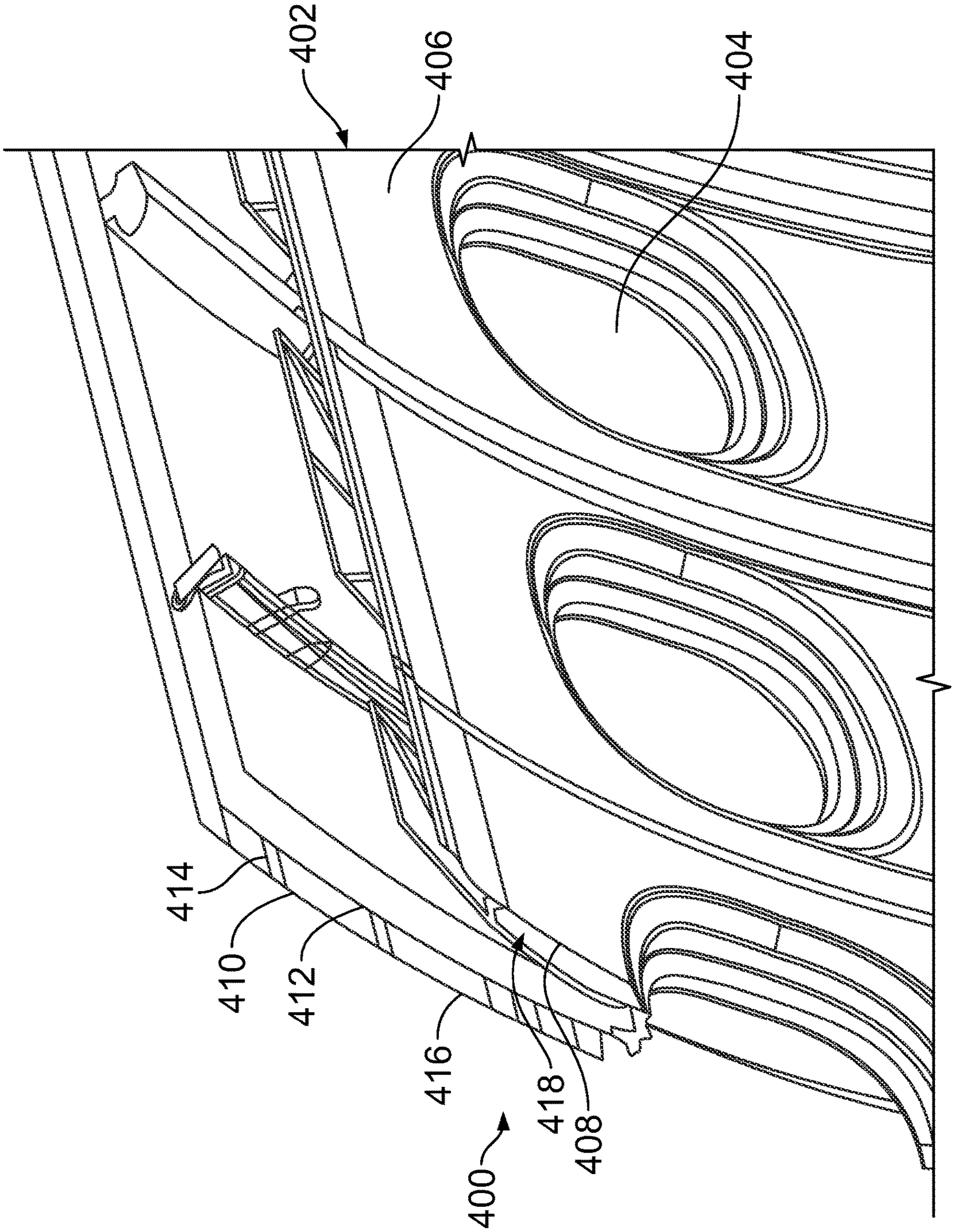
FIG. 6 illustrates a perspective view of a panel assembly that forms a portion of wall within an internal cabin of an aircraft, according to an example of the present disclosure.

FIG. 6 illustrates a perspective view of a panel assembly 400 that forms a portion of wall 402 within an internal cabin of an aircraft, according to an example of the present disclosure. The panel assembly 400 includes a plurality of window openings 404. Optionally, the panel assembly 400 may not include window openings.

The panel assembly 400 includes a first or inner ply 406, which faces the internal cabin. An outer surface 408 of the inner ply 406 facing away from the internal cabin may include a lining. For example, the lining may be secured to the outer surface 408.

The panel assembly 400 also includes a second or outer ply 410. In at least one example, insulation 412 is secured to an inner surface 414 of the outer ply 410 facing toward the internal cabin. Optionally, the panel assembly 400 may not include the insulation 412. An outer surface 416 of the outer ply 410 is opposite from the inner surface 414.

An air gap 418 may be formed between the inner ply 406 and the outer ply 410. The air gap 418 separates the inner ply 406 from the outer ply 410. Optionally, the panel assembly 400 may not include the air gap. Instead, the inner ply 406 may be directly coupled to the outer ply 410.

In at least one example, one or more surfaces of the panel assembly 400 include liquid management patterns, as described herein. For example, the outer surface 408 of the inner ply 406 may include liquid management patterns, as described herein. As another example, the inner surface 414 of the outer ply 410 may include liquid management patterns. In at least one example, both the outer surface 408 of the inner ply 406 and the inner surface 414 of the outer ply 410 may include liquid management patterns. In at least one example, inner and outer surfaces of the inner ply 406 and inner and outer surfaces of the outer ply 410 may include liquid management patterns.

As shown in FIG. 6, a wall of an internal cabin of an aircraft may include one or more panel assemblies 400. Optionally, various other portions of the aircraft may be formed by one or more panel assemblies 400. For example, interior monuments, such as lavatories, closets, cabinets, section dividers, and the like may include one or more panel assemblies 400. As another example, portions of stowage bin assemblies may include one or more panel assemblies 400. The panel assemblies 400 may be sized and shaped as desired.

Figure 7:
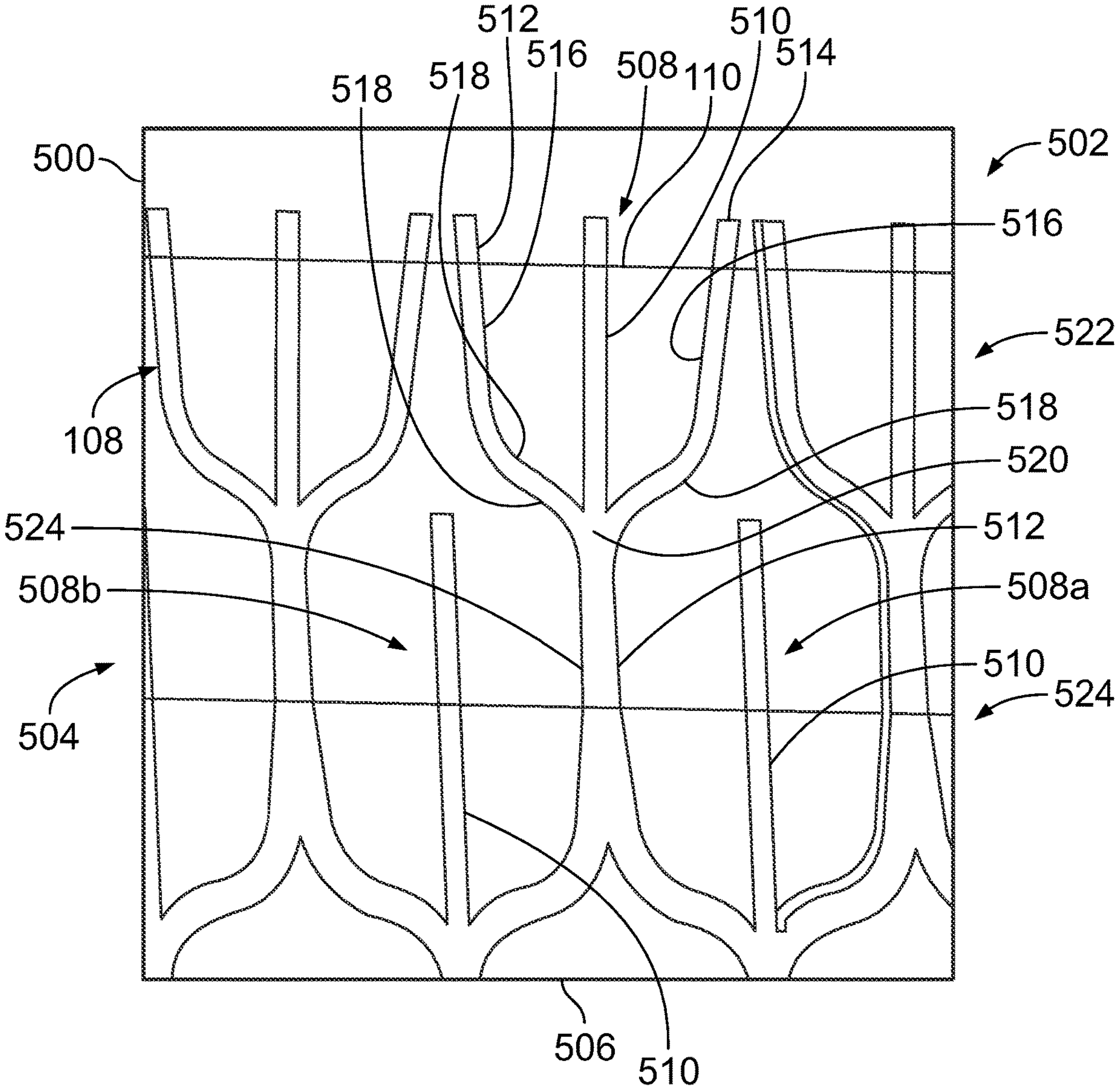
FIG. 7 illustrates a front view of a surface of a panel assembly, according to an example of the present disclosure.

FIG. 7 illustrates a front view of a surface 500 of a panel assembly 502, according to an example of the present disclosure. The panel assembly 400 shown in FIG. 6 is an example of the panel assembly 502. The surface 500 has been treated (such as via printing) to provide a liquid flow path 108, as described herein. The surface 500 may be an outer and/or inner surface of an outer ply (such as the outer ply 410 shown in FIG. 6), an outer and/or inner surface of an inner ply (such as the inner ply 406 shown in FIG. 6), and/or the like.

The liquid flow path 108 includes a flow-directing network 504 that is configured to divert liquid to a desired location, such as toward a bottom 506 of the panel assembly 502, via gravity or inertial force. The flow-directing network 504 includes a plurality of interconnected flow director elements 508 formed between banks 110. The banks 110 provide barriers surrounding the flow-directing network 504. The flow-director elements 508 have a first wettability that is configured to allow for fluid flow, while the banks 110 have a second wettability that resists fluid flow. The first wettability is associated with a first surface energy. The second wettability is associated with a second surface energy, which is lower than the first surface energy (conversely, the first surface energy is higher than the second surface energy). The first surface energy provides a smooth surface that allows for fluid flow. The second surface energy provides a rough surface (that is, rougher than the smooth surface provided by the first surface energy) that resists fluid flow. As such, liquid tends to bead on the banks 110. The liquid beads on the banks 110, and moves to the liquid flow paths 108, via gravity, where the liquid then freely flows downwardly, via gravity, towards a desired location, such as towards the bottom 506.

In at least one example, one or more of the flow director elements 508 includes a central stem 510 connected to a first lateral branch 512 and a second lateral branch 514. The central stem 510 provides a longitudinal channel that extends towards the bottom 506. The central stem 510 may be a linear channel, formed as described herein. The first lateral branch 512 may be a mirror image of the second lateral branch 514. The first lateral branch 512 and the second lateral branch 514 include an upper channel 516 that downwardly angles towards the central stem 510. The upper channels 516 connect to an inwardly-curved channel 518 (which inwardly curves towards the central stem 510). The inwardly-curved channel 518 connects to an outwardly-curved channel 518 that connects to a lower portion of the central stem 510, thereby providing a union 520 between the central stem 510, the first lateral branch 512, and the second lateral branch 514.

The flow director elements 508 may be sized and shaped differently than shown. In at least one embodiment, the flow director elements 508 include more or less branches. For example, the flow director elements 508 may include two lateral branches on either side of the central stem 510. As another example, the flow director elements 508 may not include the central stem. As another example, the branches 512 and 514 may not be symmetrical about the central stem 510.

As shown in FIG. 7, the flow-directing network 504 includes a first row 522 of flow director elements 508 above a second row 524 of flow director elements 508. The second row 524 may be above a third row of flow director elements, and so on. In at least one embodiment, the flow-directing network 504 may include only a single row of flow director elements 508. In at least one embodiment, instead of a flow-director network 504, the panel assembly 502 may include a single flow director element 508.

As shown in FIG. 7, the union 520 of a flow director element 508 within the first row 522 connects to (for example, is in fluid communication with) a first lateral branch 512 of a first flow director element 508*a* of the second row 524 and a second lateral branch 514 of a second flow director element 508*b* of the second row 524. As shown, the first lateral branch 512 of the first flow director element 508*a* is integrally formed and connected with the second lateral branch 514 of the second flow director element 508*b*. In this manner, flow director elements 508 within the first row 522 may interconnect and cascade with flow director elements 508 of the second row 524 (which may similarly interconnect and cascade with flow director elements 508 of a third row, and so on).

The flow director elements 508 within the first row 522 may be sized and shaped the same as the flow director elements 508 within the second row 524. Optionally, the flow director elements 508 within the first row 522 may be sized and shaped differently than the flow director elements 508 within the second row 524. For example, the central stems 510 and/or the first and second lateral branches 512 and 514 of the flow director elements 508 within the second row 524 may be larger (for example, have increased height and/or area) than those within first row 522, or vice versa. The flow director elements 508 within each row may be sized and shaped the same or differently.

The flow director elements 508 provide a pattern formed by surface treatment, as described herein, that is configured to divert liquid toward a desired location, such as the bottom 506 of the panel assembly 502. The sizes and shapes of the flow director elements 508 may vary depending on setting, application, part geometry, part orientation, and/or the like.

In operation, moisture that condenses on the rougher areas, defined by the banks 110, forms beads. The external flow of liquid on the banks 110 flows in an uncontrolled manner until it intersects a portion of a flow director element 508, which provides a relatively smooth area that promotes controlled flow of liquid. As liquid contacts a portion of the flow director element 508, the liquid flows in a controlled manner within the flow director element 508, via gravity, due to the relatively high surface energy of the flow director element 508. Adhesion of the liquid to the higher surface energy of the flow director element 508 prevents, minimizes, or otherwise reduces the potential of the liquid flowing onto the banks 110. The panel assembly 502 facilitates liquid flow by destabilizing droplet shapes on the roughened areas of the banks 110, allowing inertial forces to dominate surface tension, and promote flow into and through the liquid flow path 108, defined by the one or more flow director elements 508.

Figure 8:
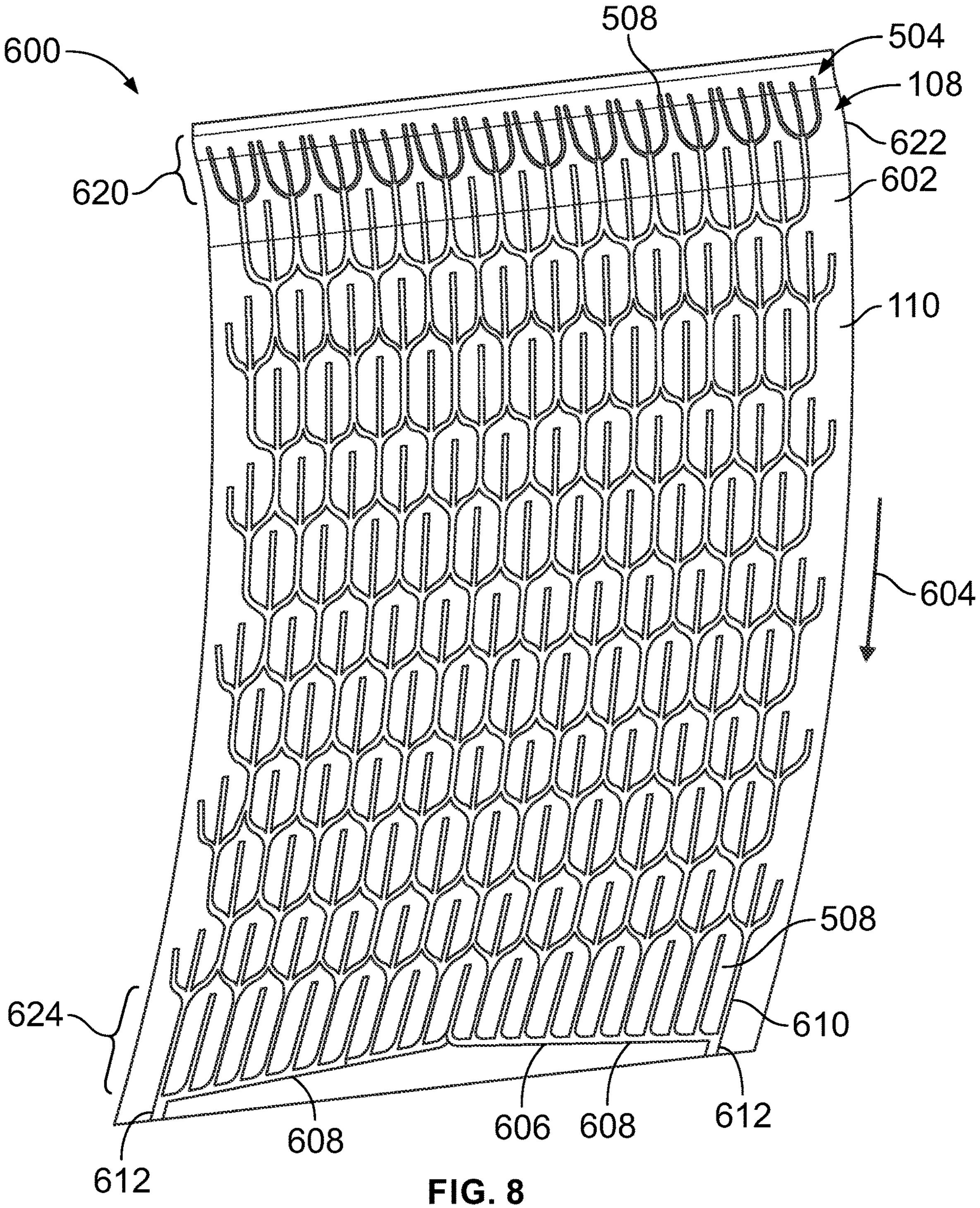
FIG. 8 illustrates a perspective front view of a panel assembly, according to an example of the present disclosure.

FIG. 8 illustrates a perspective front view of a panel assembly 600, according to an example of the present disclosure. The panel assembly 400 shown in FIG. 6 and the panel assembly 502 shown in FIG. 5 are examples of and/or provide portions of the panel assembly 600 shown in FIG. 8, or vice versa. As shown, the panel assembly 600 includes a liquid management pattern, such as a liquid flow path 108 formed on a surface 602 thereof. The liquid flow path 108 includes a flow-directing network 504 of interconnected and cascading flow director elements 508. For example, the flow-directing network 504 includes ten or more rows of interconnected flow director elements 508. Optionally, the flow-directing network 504 may include less than ten rows of interconnected flow director elements 508.

Liquid on the surface 602 beads on the banks 110 and moves, via gravity or inertial force, into the flow director elements 508. The liquid flows downwardly in the direction of arrow A towards a lower drain channel 606 of the flow-directing network 504. The lower drain channel 606 is formed in the same manner as the liquid flow directors 508. That is, the lower drain channel 606 has a wettability that promotes liquid flow, in contrast to the banks 110.

Lower drain channel 606 may include downwardly angled segments 608 that connect to the lowest row 610 of flow director elements 508. The segments 608 may, in turn, connect to drain outlets 612.

As shown, the height or area of the flow director elements 508 within higher rows may be less than the height or area of the flow director elements 508 within lower rows. That is, a height of flow director elements in lower rows is greater than a height of flow director elements in upper rows. The height of flow director elements may progressively increase as rows descend. For example, the height 620 of the flow director elements 508 within the highest row 622 may be less than the height 624 of the flow director elements 508 within the lowest row 610. The increasing height progression from upper to lower rows accommodates and promotes increased flow rates.

As shown, the flow-directing network 504 is circuitous and tortuous, with numerous interconnected and cascading flow director elements 508. The multiple potential paths for liquid flow defined by the numerous interconnected flow director elements 508 accommodate an increased volume of flow. That is, flow volume increases with the number of flow director elements 508. Further, as shown, the interconnected flow director elements 508 define multiple directions for liquid flow, which ensures flow of liquid towards the bottom in the direction of arrow 604, even during orientational changes (such as when an aircraft changes altitude or attitude). Moreover, the various directional changes defined by the numerous flow direction elements 508 within the flow-directing network 504 limit flow inertial velocity, which reduces a potential of a surge flow and/or liquid overflowing the banks 110.

The panel assembly 600 may be formed of a composite thermoplastic or thermoset, for example. The pattern of flow director elements 508 within the flow-directing network 504 may be formed by surface treatment, as described herein. For example, the flow director elements 508 may be formed by texture pattern on a forming die, chemical etching on a metallic surface, and/or the like.

Figure 9:
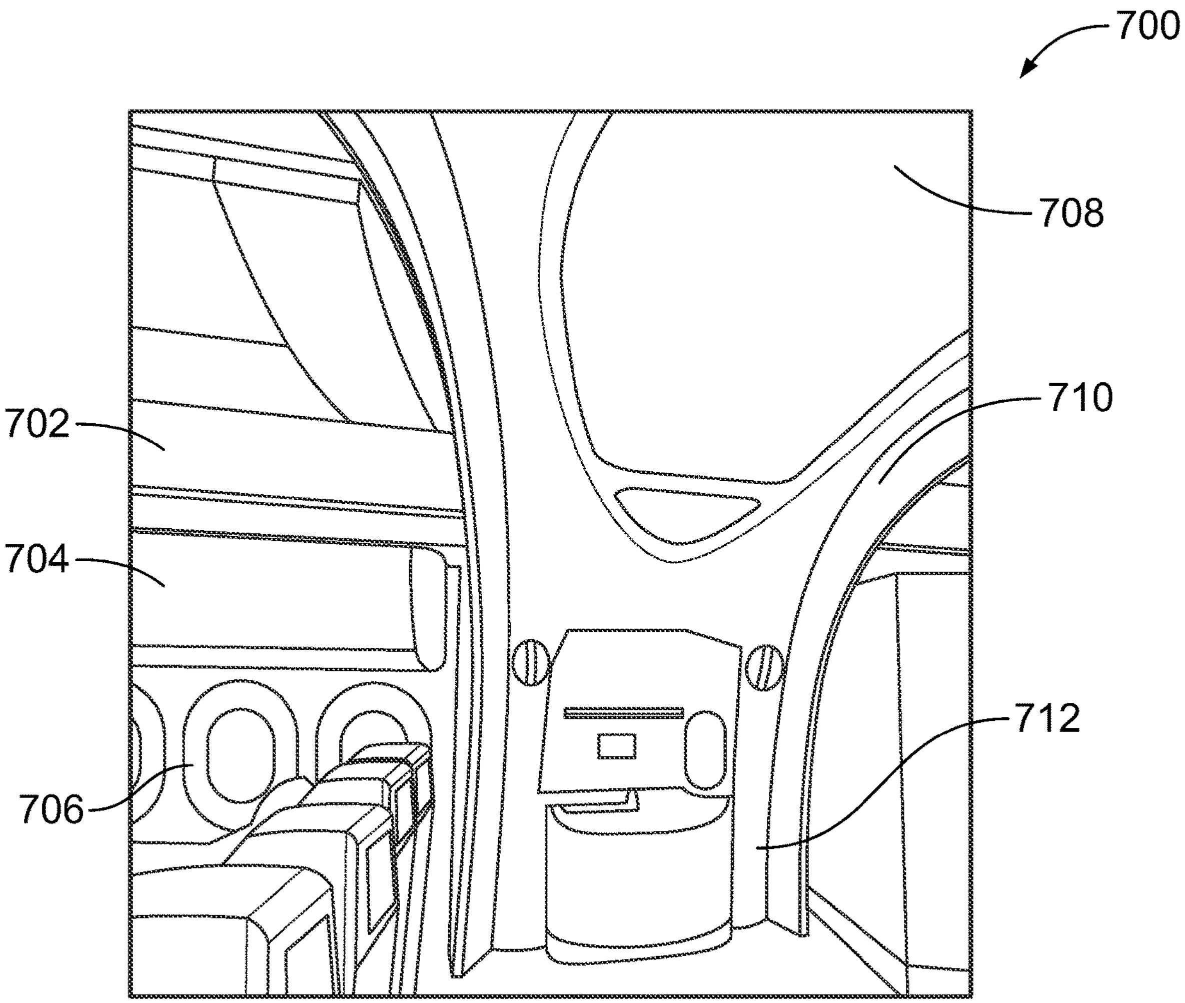
FIG. 9 illustrates a perspective internal view of an internal cabin of a vehicle, according to an example of the present disclosure.

FIG. 9 illustrates a perspective internal view of an internal cabin 700 of a vehicle, (such as the aircraft 300 shown in FIG. 5) according to an example of the present disclosure.

The internal cabin 700 includes numerous components that may be formed from and/or otherwise include structures, such as the structure 100 shown and described with respect to FIGS. 2 and 4A-C, panel assemblies, such as the panel assembly 400 (shown in FIG. 6), the panel assembly 502 (shown in FIG. 7), and the panel assembly 600 (shown in FIG. 8), and/or the like. For example, ceiling panels 702, stowage bin assemblies 704, sidewall panels 706, ceiling coves 708, doorway arch panels 710, doorway side panels 712, partitions, closets, lavatory walls, light valences, and/or the like may include structure and/or panel assemblies, as described herein.

Figure 10:
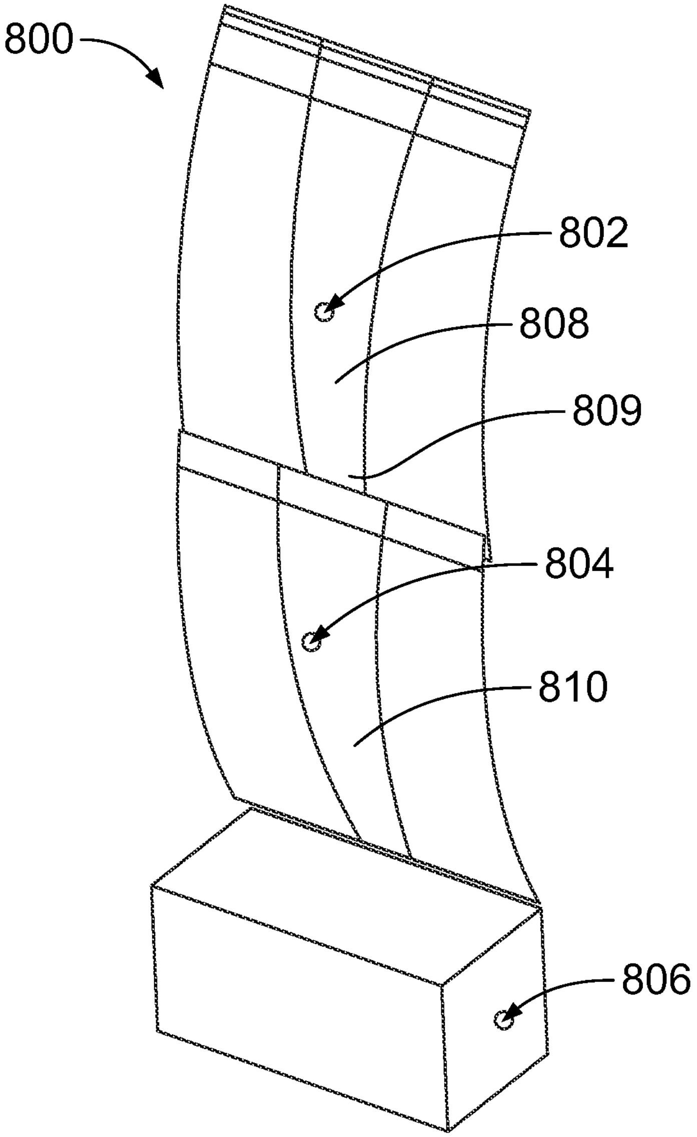
FIG. 10 illustrates a liquid flow system, according to an example of the present disclosure.

FIG. 10 illustrates a liquid flow system 800, according to an example of the present disclosure. The liquid flow system 800 includes a first panel assembly 802 coupled to a second panel assembly 804, which, in turn, is coupled to a bilge 806, such as a bilge within an aircraft. The panel assemblies 802 and 804 are connected in series, with the first panel assembly 802 secured above the second panel assembly 804. The first panel assembly 802 includes a flow channel 808 (for example, a liquid flow path) that leads into a flow channel 810 (for example, a liquid flow path) of the second panel assembly 804. The flow channel 810 leads into the bilge 806. The flow channels 808 and 810 are formed through surface treatment, as described herein. The flow channels 808 and 810 may be sized and shaped differently than shown. Further, the liquid flow system 800 may include more or less panel assemblies than shown.

The liquid flow system 800, such as a flow directing network, may include at least one flow transmission orifice 809 on the boundary of the outer surface of the first panel assembly 802. The area may be located and oriented such that liquid from the flow directing network is channeled to the orifice 809 and thus to adjacent aircraft components, such as to the second panel assembly 804. The adjacent components may also include flow direction features.

As an example, the flow direction features of the adjacent component (for example, the second panel assembly 804) may couple to a flow directing network of the first component (for example, the first panel assembly 802). The flow directing network on the adjacent component may include a greater capacity such that liquid diverted by the at least one flow transmission orifice of the first component is accommodated along with moisture deposited on the outer surface of the second component from other sources.

In at least one example, at least two adjacent components with surfaces that include flow directing networks are present such that liquid flows continuously across the outer surfaces of the at least two components. The surface of the at least two components may include a moisture control network that directs moisture towards a designated aircraft bilge zone, such as the bilge 806.

As described herein, examples of the present disclosure provide structures, panel assemblies, and methods of forming structures that are configured to efficiently manage moisture, such as within an aircraft, for example. The structures include liquid management patterns, such as liquid retaining patterns and/or liquid flow paths, that are formed through surface treatment, such as printing. Examples of the present disclosure provide lightweight and cost-effective structures that are integrally formed with liquid management patterns. As such, weight for a system can be reduced as there is a reduced need for separate and distinct moisture management devices. Instead, the structures that form portions of a system, such as an aircraft, are integrally formed with their own liquid management patterns.

Certain examples of the present disclosure provide a structure, such as a panel, sheet, or the like. The structure has a surface, such as an exposed outer surface. A portion of the surface is treated, such as via printing, to modify a wettability of the portion of the structure. At least one liquid management pattern is formed on the surface through the treated portion.

Figure 11:
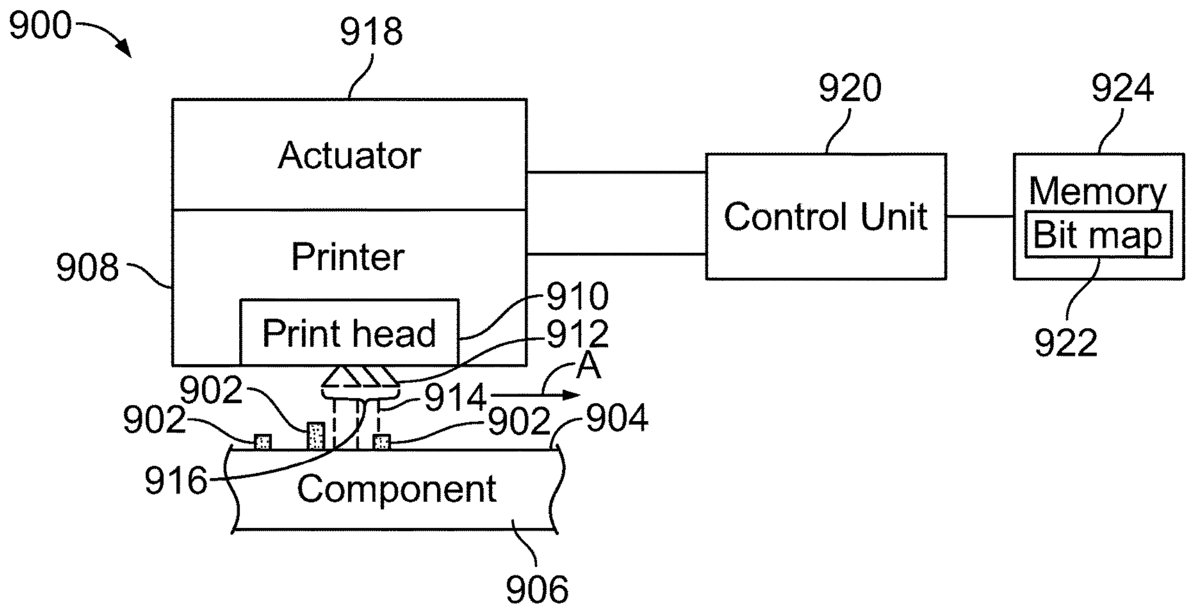
FIG. 11 illustrates a simplified block diagram of a system, according to an example of the present disclosure.

FIG. 11 illustrates a simplified block diagram of a system 900, according to an example of the present disclosure. The system 900 is configured to print one or more tactile features 902 on a surface 904 of a component 906. The features 902 can provide liquid management patterns, as described herein. The surface 904 is an example of the surface 104 shown in FIGS. 1, 2, and 4A-C. The component 906 is an example of the structure 100 shown in FIGS. 1, 2, and 4A-C. FIGS. 4A-C shows examples of the features 902 (such as features 130*a*, 130*b*, and 130*c*). FIGS. 7-10 also show and describe surfaces and features that can be provided by the system 900.

In at least one example, the component 906 is a portion of a vehicle, such as an outer surface of a fuselage, a wing, or the like. As another example, the component 906 is within an internal cabin of the vehicle, such as a wall, ceiling, floor, or the like within the vehicle. As another example, the component 906 can be a structure on or within a fixed structure. As another example, the component 906 can be a substrate, such as paper, a panel, or the like. The surface 904 of the component 906 can be flat and planar. As another example, the surface 904 can include one more curves, such as can have a regular or irregular curvature.

The system 900 includes a printer 908 having a print head 910, which includes one or more nozzles 912 configured to deposit ink 914 onto the surface 904. In at least one example, the print head 910 includes a single nozzle 912. As another example, the print head 910 includes two, three, four, five, or more nozzles 912. A swath 916 of the print head 910 is a width across the one or more nozzles 912.

The printer 908 is coupled to an actuator 918, which is configured to move the print head 910. In at least one example, the print head 910 includes a single axis servo motor having a linear actuator. The actuator 918 is configured to move the print head 910 over a pass in relation to the surface 904 of the component 906. The actuator 918 can be separate and distinct from the printer 908. As another example, the printer 908 includes the actuator 918.

A control unit 920 is in communication with the printer 908 and the actuator 918, such as through one or more wired or wireless connections. The control unit 920 is configured to operate the actuator 918 and the printer 908 to form the tactile features 902 on the surface 904 of the component 906 based on data 922 stored within a memory 924 that is communication with the control unit 920, such as through one or more wired or wireless connections. For example, the data 922 can be a bit map of the tactile features 902 to be formed on the surface 904 of the component 906. The memory 924 can be separate and distinct from the control unit 920. As another example, the control unit 920 includes the memory 924.

In operation, in order to form the tactile features 902, the printer 908 is moved in a single pass in the direction of arrow A (such as from left to right, right to left, top to bottom, or bottom to top) in relation to the surface 904. The control unit 920 operates the printer 908 to deposit the ink 914 onto the surface 904 to form the tactile features 902 during the single pass of the printer 908. In order to form the tactile features 902 having different attributes (such a heights and widths), the control unit 920 varies the speed of the printer 908 in the direction of arrow A during the single pass, instead of operating the printer over multiple passes. Optionally, the printing can include multiple passes to form the textured features. Also, optionally, the printing can include a constant speed, or a variable speed.

Referring to FIGS. 1-11, the control unit 920 can operate the printer 908 to form various features on structures. For example, the control unit 920 can operate the printer 908 to form various liquid management patterns (such as liquid retaining patterns, liquid flow paths, and/or the like) as shown and described with respect to FIGS. 2-4C, 7, 8, and 10.

Figure 12:
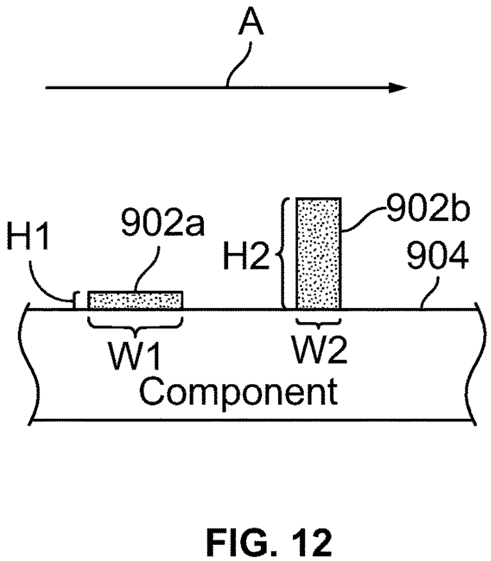
FIG. 12 illustrates a simplified lateral view of a component, according to an example of the present disclosure.

FIG. 12 illustrates a simplified lateral view of the component 906, according to an example of the present disclosure. Referring to FIGS. 11 and 12, the control unit 920 operates the printer 908 to form the tactile features 902*a* and 902*b* during a single pass of the print head 910 in the direction of arrow A. As shown, the tactile feature 902*a* has a first width W1 along a portion of the surface 904, and a first height H1 above the surface 104. The tactile feature 902*a* has a second width W2 along a portion of the surface 904, and a second height H2 above the surface 904. The first width W1 differs from the second width W2. As shown, the first width W1 is greater than the second width W2. The first height H1 differs from the second height H2. As shown, the first height H1 is less than the second height H2.

In order to form a taller tactile feature having a thinner width, such as the tactile feature 902*b*, the control unit 920 decreases the speed of the print head 910 during the single pass in the direction of arrow A, thereby concentrating more ink droplets at a tighter location. Consequently, the ink droplets form the higher, thinner tactile feature 902*b*. In contrast, in order to form a shorter tactile feature having a greater width, the control unit 920 increases the speed of the print head 910 during the single pass in the direction of arrow A, thereby spreading the ink droplets over a wider area, and which reduces the build-up in height. In this manner, the control unit 920 operates the printer 908 to form tactile features 902 having different attributes (such as different heights and/or widths) on the surface 904 of the component 906 by varying the speed of the print head 910, as controlled by the actuator 918, during the single pass in the direction of arrow A.

Figure 13:
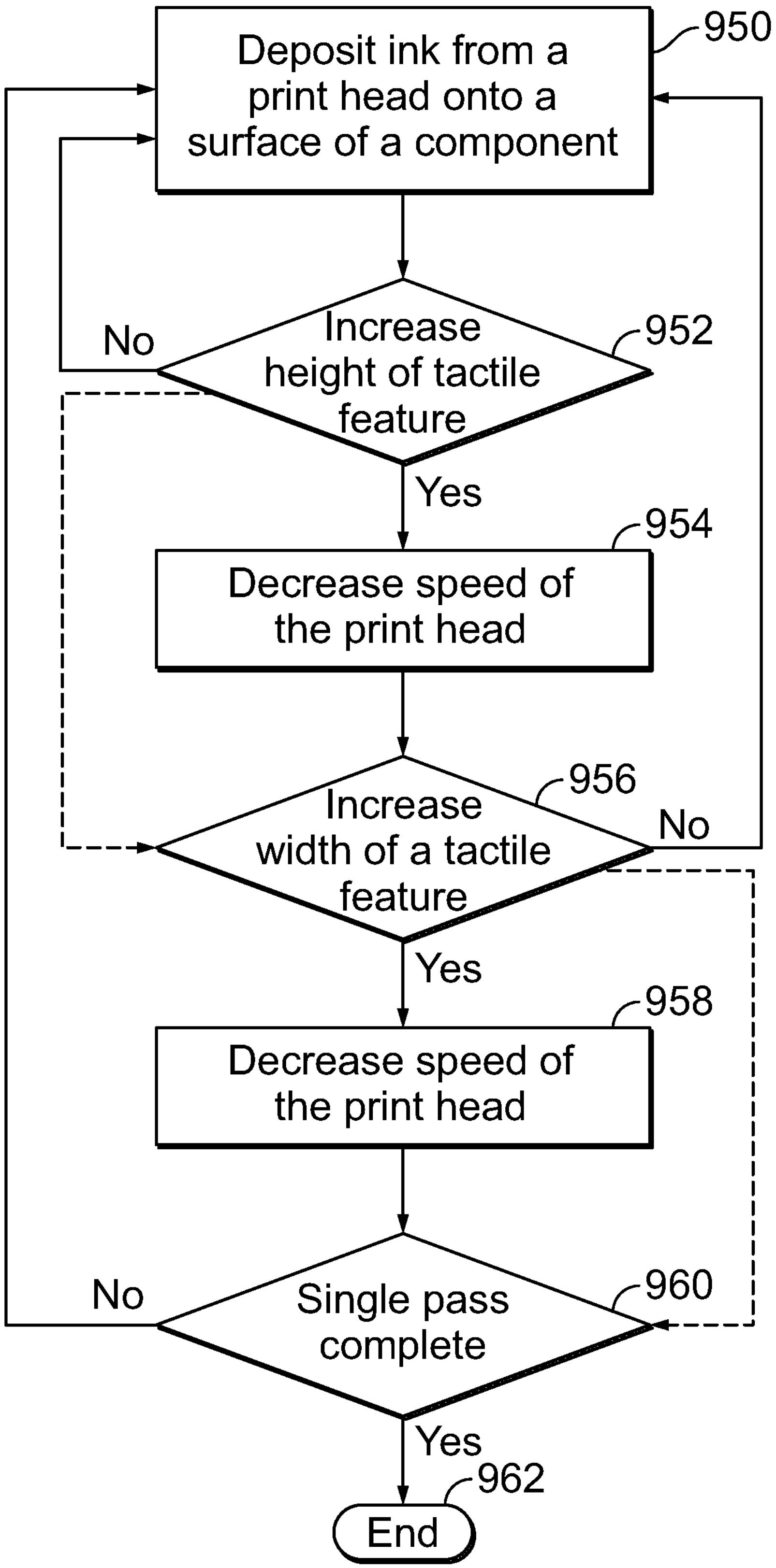
FIG. 13 illustrates a flow chart of a method, according to an example of the present disclosure.

FIG. 13 illustrates a flow chart of a method, according to an example of the present disclosure. Referring to FIGS. 11-13, at 950, the control unit 920 operates the printer 908 to deposit the ink 914 from the print head 910 onto the surface 904 of the component 906. At 152, the control unit 920 determines, such as via the data 922 in the memory 924, if a height of a tactile feature 902 to be printed on the surface 904 is to be increased. If not, the method returns to 950 (or proceeds to 956).

If, however, the height of the tactile feature 902 is to be increased, the control unit 920 decreases the speed of the print head 910 (via operation of the actuator 918) during the single pass in the direction of arrow A, thereby building up an increased amount of ink at a particular location (defined by the data 922) to form the tactile feature 902. Such a feature can have a reduced width.

At 956, the control unit 920 determines, such as via the data 922 in the memory, if a width of a tactile feature 902 to be printed on the surface 904 is to be increased. Step 956 can occur before 952. The method can include step 956 and not step 952, or vice versa.

If the width of a tactile feature 902 is to be increased, the method can return to 950, or optionally proceed to 960. If, however, the width of the tactile feature 902 is to be increased (and the height reduced), the method proceeds from 956 to 958, at which the control unit 920 increases the speed of the print head 910 (via operation of the actuator 918) during the single pass in the direction of arrow A to form the tactile feature 902. Such a feature can have a reduced height.

At 960, the control unit 920 determines if the single pass is complete. If not, the method returns to 950. If, however, the control unit 920 determines that the single pass is complete, the method proceeds from 960 to 962, at which the method ends.

As described herein, the control unit 920 is configured to vary a speed of the print head 910 of the printer 908 during a single pass in the direction of arrow A to form tactile features 902 having different attributes, such as different heights and/or different widths. Optionally, the control unit 920 can form such tactile features 902 by varying the speed of the print head 910 using additional passes in the direction of arrow A, the opposite of arrow A, and/or the like.

In at least one example, the control unit 920 is configured to operate the printer to build tactile textured features 902 in a single pass of the print head 910 in the direction of arrow A. In at least one example, instead of using an established print clock from an encoder pulse train, the control unit 920 maintains the print clock at a frequency that optimizes head acoustics. The control unit 920 can then operate the printer 908 to form the tactile features 902 through the data 922 and varying the speed of the print head 910. Faster print speeds create a shorter texture (that is, a reduced height) while slower print speeds create a taller texture (that is, an increased height). The data 922, such as bit map data, accounts for any complex curvature of the surface 904 to achieve a desired printed output.

In at least one example, the desired output display to be formed on the surface 904 (such as printed text, images, graphics, and/or the like) is stored as the data 922 within the memory 924. The output display can be created through one or more steps, which can be conducted by the control unit 920. For example, the output display can be created through unit vector mesh unwrapping and image texturing in conjunction with pixel clustering in relation to print speed.

In at least one example, rather than defining the print clock with encoder pulses received from a servo motor, the control unit 920 sets the print clock set to a specific frequency that optimizes acoustics of the print head 910, such as 30*k* Hz. The control unit 920 constantly sends a 30 kHz print clock to the print head 910. Consequently, when printing at different speeds, tactile features 902 having different attributes are formed.

In at least one example, the tactile features 902 are created in a single pass when jetting at a constant print frequency using an ultraviolet curable translucent ink. The speed of the print head 910 dictates the height of the tactile features 902.

In at least one example, the control unit 920 operates the printer 908 to constantly jet the ink 914 from the nozzle(s) 912 during the single pass in the direction of arrow A. In order to form the textured features 902 having different attributes, the control unit 920 synchronizes the speed of the print head 910 with the data 922, such as the bit map data, to enable single pass complex curvature textured printing. The control unit 920 operates to vary the attributes (for example, heights and/or widths) of the tactile features 902 by controlling the speed of the print head 910 in the direction of arrow A in accordance with the data 922. The speed of the print head 910 is varied during the single pass in the direction of arrow A to vary attributes of the tactile features 902.

The systems and methods described here can be used to print tactile features 902 on complex curved surfaces, such as within an internal cabin of a commercial aircraft. The systems and methods described herein can be used in place of traditional embossing processes.

In at least one example, the control unit 920 is configured to operate the printer 908 to form the tactile features 902 on a curved surface. For example, the control unit analyzes the shape of the curved surface, and provides a unit vector map of the curved surface, such as in a two dimensional plane. By unit vector mapping the curved surface, the control unit 920 ensures that the formed tactile features 902 on the curved surface are accurate and undistorted.

As described herein, examples of the present disclosure provide a method including controlling, by the control unit 920, the printer 908 to form one or more tactile features 902 on the surface 904 of the component 906. In at least one example, the tactile features 902 provide liquid management patterns (such as liquid retaining patterns and/or liquid flow paths) on a surface of a structure of a vehicle, such as an aircraft. Said controlling includes varying a speed of the print head 910 of the printer 908 to vary one or more attributes of the one or more tactile features 902. In at least one example, said varying the speed includes varying the speed of the print head 910 of the printer 908 during a single pass of the print head 910 in relation to the surface 904 of the component 906.

In at least one example, the one or more tactile features 902 include a plurality of tactile features 902. At least two of the plurality of tactile features 902 differ in relation to the one or more attributes. For example, the two different tactile features 902 can have different heights, and/or different widths.

In at least one example, the attributes include one or both of height or width. For example, said varying the speed includes reducing the speed of the print head 910 to form the one or more tactile features 902 having an increased height. In this example, the one or more tactile features 902 can also have a reduced width. In at least one example, said varying the speed includes increasing the speed of the print head 910 to form the one or more tactile features 902 having an increased width. In this example, the one or more tactile features 902 can also have a reduced height.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 920 may be or include one or more processors that are configured to control operation, as described herein.

The control unit 920 is configured to execute a set of instructions that are stored in one or more data storage units or elements (such as one or more memories), in order to process data. For example, the control unit 920 may include or be coupled to one or more memories. The data storage units may also store data or other information as desired or needed. The data storage units may be in the form of an information source or a physical memory element within a processing machine.

The set of instructions may include various commands that instruct the control unit 920 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 920. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 920 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Further, the disclosure comprises examples according to the following clauses:

Clause 1. A method comprising:
- printing one or more features on a surface of a structure of an aircraft; and
- providing, by the one or more features, one or more liquid management patterns.

Clause 2. The method of Clause 1, wherein the one or more liquid management patterns comprise one or more liquid retaining patterns.

Clause 3. The method of Clauses 1 or 2, wherein the one or more liquid management patterns comprise one or more liquid flow paths.

Clause 4. The method of any of Clauses 1-3, further comprising curing the one or more features with ultraviolet (UV) light.

Clause 5. The method of any of Clauses 1-4, wherein the structure is within an internal cabin of the aircraft.

Clause 6. The method of any of Clauses 1-5, wherein said printing comprises controlling, by a control unit, a printer to form the one or more features on the surface of the structure.

Clause 7. The method of Clause 6, wherein said controlling comprises varying a speed of a print head of the printer to vary one or more attributes of the one or more features.

Clause 8. The method of Clause 7, wherein said varying the speed comprises varying the speed of the print head of the printer during a single pass of the print head in relation to the surface of the structure.

Clause 9. The method of Clauses 7 or 8, wherein said varying the speed comprises reducing the speed of the print head to form the one or more features having an increased height.

Clause 10. The method of any of Clauses 7-9, wherein said varying the speed comprises increasing the speed of the print head to form the one or more features having an increased width.

Clause 11. The method of any of Clauses 6-10, further comprising creating, by the control unit, a desired output display that includes the one or more features through unit vector mapping.

Clause 12. The method of any of Clauses 6-11, wherein said controlling further comprises jetting ink from one or more nozzles of the print head at a constant print frequency.

Clause 13. The method of any of Clauses 1-12, further comprising one or more of in-mold texturing, bonding, cutting, chemical etching, or superficial foaming at least a portion of the one or more features.

Clause 14. A method comprising:

printing one or more features on a surface of a structure of an aircraft, wherein said printing includes controlling, by a control unit, a printer to form the one or more features on the surface of the structure;

curing the one or more features with ultraviolet (UV) light; and providing, by the one or more features, one or more liquid management patterns.

Clause 15. The method of Clause 14, wherein the one or more liquid management patterns comprise one or more liquid retaining patterns.

Clause 16. The method of Clauses 14 or 15, wherein the one or more liquid management patterns comprise one or more liquid flow paths.

Clause 17. The method of any of Clauses 14-16, wherein the structure is within an internal cabin of the aircraft.

Clause 18. The method of any of Clauses 14-17, wherein said controlling comprises varying a speed of a print head of the printer to vary one or more attributes of the one or more features.

Clause 19. The method of Clause 18, wherein said varying the speed comprises varying the speed of the print head of the printer during a single pass of the print head in relation to the surface of the structure, and wherein said varying the speed includes reducing the speed of the print head to form the one or more features having an increased height, and increasing the speed of the print head to form the one or more features having an increased width.

Clause 20. The method of any of Clauses 14-19, wherein said controlling further comprises jetting ink from one or more nozzles of the print head at a constant print frequency.

As described herein, examples of the present disclosure provide efficient moisture management within an aircraft. Further, examples of the present disclosure provide efficient methods of forming structures that are configured to manage moisture. Also, examples of the present disclosure provide systems and methods for efficiently and effectively printing features on a surface of component. Additionally, examples of the present disclosure provide methods of printing features that are faster than conventional methods of using multiple passes of a print head.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

printing one or more features on a surface of a structure within an internal cabin of an aircraft; and providing, by the one or more features, one or more liquid management patterns.

2. The method of claim 1, wherein the one or more liquid management patterns comprise one or more liquid retaining patterns.

3. The method of claim 1, wherein the one or more liquid management patterns comprise one or more liquid flow paths.

4. The method of claim 1, further comprising curing the one or more features with ultraviolet (UV) light.

5. The method of claim 1, wherein said printing comprises controlling, by a control unit, a printer to form the one or more features on the surface of the structure.

6. The method of claim 5, wherein said controlling comprises varying a speed of a print head of the printer to vary one or more attributes of the one or more features.

7. The method of claim 6, wherein said varying the speed comprises varying the speed of the print head of the printer during a single pass of the print head in relation to the surface of the structure.

8. The method of claim 6, wherein said varying the speed comprises reducing the speed of the print head to form the one or more features having an increased height.

9. The method of claim 6, wherein said varying the speed comprises increasing the speed of the print head to form the one or more features having an increased width.

10. The method of claim 5, further comprising creating, by the control unit, a desired output display that includes the one or more features through unit vector mapping.

11. The method of claim 5, wherein said controlling further comprises jetting ink from one or more nozzles of the print head at a constant print frequency.

12. The method of claim 1, further comprising one or more of in-mold texturing, bonding, cutting, chemical etching, or superficial foaming at least a portion of the one or more features.

13. A method comprising:

printing one or more features on a surface of a structure within an internal cabin of an aircraft, wherein said printing includes controlling, by a control unit, a printer to form the one or more features on the surface of the structure;

curing the one or more features with ultraviolet (UV) light; and providing, by the one or more features, one or more liquid management patterns.

14. The method of claim 13, wherein the one or more liquid management patterns comprise one or more liquid retaining patterns.

15. The method of claim 13, wherein the one or more liquid management patterns comprise one or more liquid flow paths.

16. The method of claim 13, wherein said controlling comprises varying a speed of a print head of the printer to vary one or more attributes of the one or more features.

17. The method of claim 16, wherein said varying the speed comprises varying the speed of the print head of the printer during a single pass of the print head in relation to the surface of the structure, and wherein said varying the speed includes reducing the speed of the print head to form the one or more features having an increased height, and increasing the speed of the print head to form the one or more features having an increased width.

18. The method of claim 13, wherein said controlling further comprises jetting ink from one or more nozzles of the print head at a constant print frequency.

19. The method of claim 13, further comprising creating, by the control unit, a desired output display that includes the one or more features through unit vector mapping.

20. The method of claim 13, further comprising one or more of in-mold texturing, bonding, cutting, chemical etching, or superficial foaming at least a portion of the one or more features.

* * * * *